Figure 1:
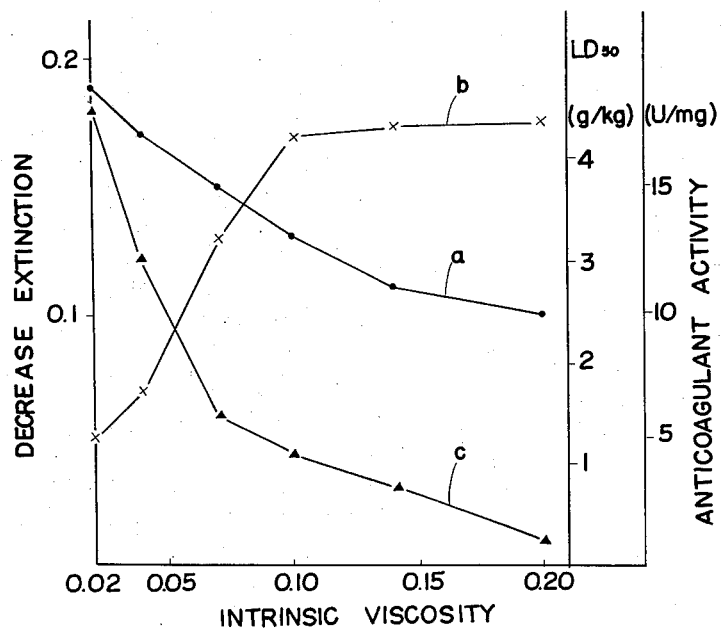

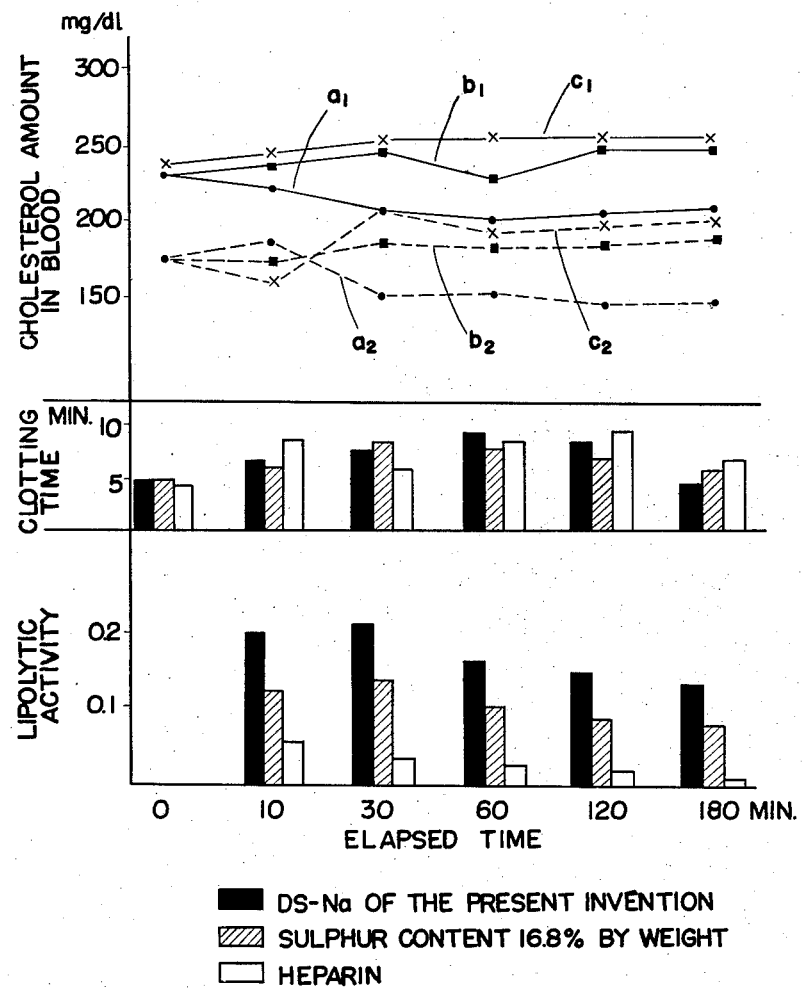

United States Patent Office 3,141,014
Patented July 14, 1964

3,141,014
SODIUM AND POTASSIUM SALTS OF THE DEX-
TRAN SULPHURIC ACID ESTER HAVING SUB-
STANTIALLY NO ANTICOAGULANT ACTIVITY
BUT HAVING LIPOLYTIC ACTIVITY AND THE
METHOD OF PREPARATION THEREOF
Eji Morii, Chikusa-ku, Nagoya, and Koichi Iwata and
Hidesaburo Kokkoku, Nishi-ku, Nagoya, Japan, assignors to Meito Sangyo Kabushiki Kaisha, Nagoya,
Japan, a corporation of Japan
Filed Mar. 21, 1961, Ser. No. 97,311
Claims priority, application Japan Mar. 31, 1960
12 Claims. (Cl. 260—234)

This invention relates to the sodium and potassium salts of dextran sulphuric acid esters having substantially no anticoagulant action but having lipolytic action and the method of preparation of these salts.

More particularly, the invention relates to the sodium and potassium salts of dextran sulphuric acid ester and the method of preparation thereof, which is characterized in that the intrinsic viscosity of said salts in a 0.7 mol saline solution at 25° C. (this condition to apply hereinafter) is 0.020–0.050 and the sulphur content thereof is 2.0–13.0% by weight. Hereinafter, the sulphuric acid esters of polysaccharides and the dextran sulphuric acid ester will be referred to, for sake of brevity as respectively sulphated polysaccharides and dextran sulphate.

Heretofore, it has been known that some of the sulphated polysaccharides, which had anticoagulant activity, had activities that would clear abnormal lipemic serums of human as well as convert the low-density lipoprotein, which implicate in atherosclerosis, to the high-density lipoprotein.

In fact, the role that the sulphated polysaccharides have played in the area of the fat metabolism and atherogenesis has been proved by numerous experiments up to the present. While this fact affords us hope that they will be fully effective in the prevention and cure of such as atherosclerosis, etc., that are believed to be brought about by hyperlipemia in the blood, on account of its action in prolongation of clotting time of blood, which is one of the properties of sulphated polysaccharides, there is the troublesomeness in their use in that their administration is accompanied by the necessity of constantly determining the blood clotting time under the full supervision of a physician. Furthermore, when these are used in the treatment of hyperlipemia, etc., even though the dose employed is much less than in case of, say, their use as an anticoagulant, it is clear that the clotting time of blood is prolonged, it being much more so when their use extends over a long period of time. Thus, the inevitable impediment of the blood's coagulating ability that occurs by their continuous administration results in restricting severely the clinical application of the sulphated polysaccharides in the treatment of atherosclerosis.

Accordingly, it is an object of the present invention to provide sodium and potassium salts of sulphated polysaccharides which are not troubled with such as the risk involved in the prolongation of clotting time of blood or the necessity of frequent blood letting and determination of the clotting time of blood in employing such sulphated polysaccharides.

Another object of the invention is to provide the sodium salt of dextran sulphate (hereinafter referred to as DS–Na), the potassium salt of dextran sulphate (hereinafter referred to as DS–K) and therapeutic compositions containing the same.

A further object of the invention is to provide a method of preparing on a commercial scale DS–Na and DS–K such as mentioned above of high purity as well as with high yields. Still further objects and advantages of the invention will become apparent from a consideration of the description to be given hereinafter.

The objects and advantages of the invention as mentioned hereinabove are achieved by those DS–Na and DS–K that are characterized in that their $[\eta]$ is 0.020–0.050 and sulphur content, 2.0–13.0% by weight.

As regards the intrinsic viscosity $[\eta]$ of the sodium and potassium salts of dextran sulphate, it is defined by the following formulas:

$$[\eta] = \lim_{C \to 0} (I_n \eta_r)/C$$

$$= \lim_{C \to 0} \eta_{sp}/C$$

wherein $\eta_r = \eta/\eta_0$.
$\eta_{sp} = (\eta - \eta_0)/\eta_0 = \eta_r - 1$ where $\eta$ = the viscosity of the solution
$\eta_0$ = the viscosity of the solvent
$C$ = the concentration at g./100 ml.

The intrinsic viscosity is determined graphically for the various concentrations by recording $(I_n \eta_r)/C$ and $\eta_{sp}/C$ with respect to C. The viscosity measurements are made with Ubbelohde's viscometer.

The sulphur content of the sodium and potassium salts of dextran sulphate are determined by the Schöniger's method (Schöniger, W., Mikrohim. Acta, 1956, page 869).

When we used the sodium salt of dextran whose sulphur content was approximately equal to 16–17% by weight but whose $[\eta]$ was of various values and investigated the relationship existing between the $[\eta]$ and respectively the lipolytic activity, the anticoagulant activity and the toxicity, we obtained results as shown in the accompanying FIG. 1.

The lipolytic activity of the salt of dextran sulphate can be determined by the ability that the clearing factor induced in the blood by the intravenous injection of the sodium salt of dextran sulphate, i.e., the so-called active plasma containing lipoprotein lipase, can clear in vitro an emulsion prepared as follows: First, the sodium salt of dextran sulphate was injected at the rate of 0.5 mg./100 g. body weight into rats of body weight between 150 to 250 grams from their femoral veins. 10 minutes after injection, the abdomens were incised and blood was letted from the abdominal aorta using a syringe containing 0.2 cc. of a 10% sodium citrate solution. The letted blood was centrifuged for 5 minutes at 2000 r.p.m., and the plasma was separated. To 1 cc. of this was mixed thoroughly 2 cc. of an emulsion prepared by adding 2 drops of a 20% sesame oil emulsion to 10 cc. of a 1/15 M phosphate buffer of pH 7.4 followed by mixing therewith 25 cc. of human plasma (dried normal human plasma used) and thereafter incubating said mixture for 1 hour at 37° C. Then the mixture was measured spectrophotometrically at 630–650 m$\mu$ (A).

This was followed by incubating this mixture for 2 hours at 37° C., and again measuring for its turbidity in the same manner (B). The reduction in turbidity $[(A) - (B)$ expressed as a $-\log T$ value] was established as the lipolytic activity.

For purpose of comparison, the above was supplemented by measurements similarly made of the plasma of rats which were not administered the sodium salt of dextran sulphate.

As to the anticoagulant activity, this was measured in terms of the international standard heparin units in accordance with the biochemical quantitative method (U.S.P. XVI, p. 319, 1960) as described in the 16th edition of the Pharmacopeia of the United States. And the biological toxicity was measured by the intravenous injection into mice in accordance with the Behrens Karber's Method.

In the accompanying drawing, the curve $a$ in all cases shows the relationship between the lipolytic activity induced by the intravenous injection of an isotonic sodium chloride solution containing 0.5% by weight of the sample, the sodium salt of dextran sulphate, and the $[\eta]$ thereof, and curves $b$ and $c$, by separate determinations from the above, of respectively the relationships between the anticoagulant activity and its $[\eta]$ and the $LD_{50}$ and its $[\eta]$ of the sodium salt of dextran sulphate.

Accordingly, from the results shown in FIG. 1, we found that for the following reasons it was necessary for the $[\eta]$ to be less than 0.050 but at least above 0.020. It was noted that when the sulphur content was constant the anticoagulant or lipolytic activity of the sodium salt of dextran sulphate was influenced by the intrinsic viscosity of the molecules, the change being such that while the anticoagulant activity increases with an increase in the intrinsic viscosity, the lipolytic activity, in contrast, shows a tendency to fall. In consideration of this fact that the reduction of the $[\eta]$ would augment the lipolytic activity by weakening the anticoagulant activity as well as diminishing the toxicity, it was found that for increasing the lipolytic activity (A) and the value of $LD_{50}$ (B) of the sodium salt of dextran sulphate, that is to say, for augmenting to a marked degree the value of $$\frac{(A) \times (B)}{(C)}$$

the necessity existed of ensuring that the $[\eta]$ was less than 0.050. On the other hand, when the $[\eta]$ becomes excessively small, for the reasons such as that the preparation and obtaining of the sodium salt of dextran sulphate is rendered difficult, and that the sodium salt of sulphated glucose, which is a constituent unit of the dextran molecule, exhibits hardly any lipolytic activity, etc., the $[\eta]$ must be at least more than 0.020.

Figure 2:
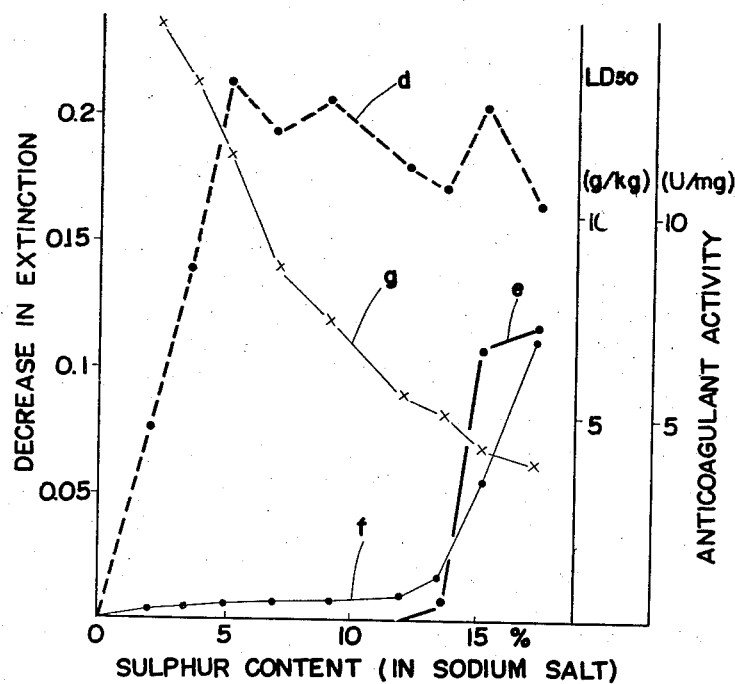

On the other hand, when we, upon using isotonic sodium chloride solutions containing 0.5% by weight of the sodium salts of dextran sulphate whose sulphur contents varied but whose $[\eta]$ was from 0.033 to 0.037 and thus could be considered as being substantially the same, investigated the lipolytic activities thereof by the intravenous injection of the above into rats in doses of respectively 0.5 mg./100 g. body weight and 0.05 mg./100 g. body weight, the results were as shown by the curves $d$ and $e$ in FIG. 2 of the accompanying drawings.

When we separately investigated the relationship with respect to the anticoagulant activity and $LD_{50}$ the curves $f$ and $g$ respectively of FIG. 2 were obtained.

When the results as shown in FIG. 2 are studied, it can be observed that the lipolytic activity of the sodium salt of dextran sulphate administered in a dose of 0.5 mg./100 g. body weight, as shown by the curve $d$, increases abruptly when its sulphur content becomes about 2.0% by weight reaching its maximum in the range of 5–15% by weight thereof. On the other hand, it is seen that the anticoagulant activity of the sodium salt of dextran sulphate, as indicated by the $f$ curve, abruptly increases when its sulphur content becomes about 14% or more, whereas at a value less than that the anticoagulant activity shows an exceedingly low value.

The $LD_{50}$ of the sodium salt of dextran sulphate, on the other hand, as shown by the $g$ curve falls as the sulphur content increases. Thus, while it is seen that the toxicity actually increases, in the range that corresponds to a sulphur content from 2.0 to 13.0% by weight, the $LD_{50}$ becomes 16 to 5 g./kg., and therefore the extent of the toxicity is as a matter of fact such that it can be practically ignored as it hardly would have any ill effects on the human body.

When the foregoing results are put together it can be seen the sodium salt of dextran sulphate with a sulphur content of 2.0–13.0% by weight is substantially without any anticoagulant activity but on the other hand possesses very great lipolytic activity with small toxicity. It is from these relationships that exist between the $[\eta]$ and the sulphur content of the sodium salt of dextran sulphate on one hand and the lipolytic activity, the anticoagulant activity and the toxicity on the other that led us to the discovery that the DS–Na of a sulphur content of 2.0–13.0% by weight and $[\eta]$ of 0.020–0.050 had substantially no anticoagulant activity but possessed very great lipolytic activity.

We also found that the potassium salt of dextran sulphate also had activities that were completely identical to that of the aforesaid sodium salt of dextran sulphate.

As shown by the curve $e$ in FIG. 2, it can be seen that in case the sodium salt of dextran sulphate was intravenously injected into rats in a dose of 0.05 mg./100 g. body weight the lipolytic activity would not be manifested unless the sulphur content was more than about 14% by weight. And in such a case, that the anticoagulant activity was induced simultaneously is apparent from the curve $f$. Moreover, it can be seen that in the intravenous injection into a living body of DS–Na or DS–K in accordance with the present invention having an intrinsic viscosity of 0.020–0.050 and a sulphur content of 2.0–13.0% by weight the administration in a dose of 0.05 mg./100 g. body weight would hardly manifest any lipolytic activity.

However, even though the sodium salt of dextran sulphate of a sulphur content of about more than 14% by weight in a dose of 0.05 mg./100 g. body weight does induce lipolytic activity in the blood for curing hyperlipemia, in view of the fact that this salt of dextran sulphate as a matter of fact would possess strong anticoagulant activity, it stands to reason in case of its continuous administration that consideration must be given to the risk that considerable hindrance will be brought about in the blood coagulating ability. This would be contrary to the primary object of the invention which intends to provide a drug that has substantially no anticoagulant activity but has lipolytic activity, and as a matter of fact, the sodium salt of dextran sulphate of such a sulphur content cannot be used safely and over a long period of time in the treatment of a state of hyperlipemia associated with atherosclerosis.

Thus, as a result of our investigation into the dosages of the DS–Na or DS–K of the present invention to be actually used when injecting into the veins of the human body, we found that when the DS–Na or DS–K was administered at the rate of 1.2–6.0 mg./kg., it being about 1.2 units/kg. in terms of anticoagulant activity, and thus with scarcely any side reactions such as the impeding of blood coagulation, etc. appearing, lipolytic activity, which the invention intends to provide, was fully induced.

When, as a sample of the DS–Na of the present invention, a DS–Na having an intrinsic viscosity of 0.040 and a sulphur content of 2.8% by weight was used so that its anticoagulant activity would become 1.2 units/kg. and similarly a sodium salt of dextran sulphate of higher degree of sulphuric acid esterification whose intrinsic viscosity was 0.028 and sulphur content was about 16.8% by weight (hereinafter to be referred to as DHS–Na) and heparin were used and each were injected intravenously into the human body, results, as shown in FIG. 3, were obtained.

As shown at the lower part of FIG. 3, the DS–Na of the present invention has a lipolytic activity about 1.5 times greater than that of DHS–Na and about 3–4 times that of heparin.

On the other hand, the curve $a_1$ at the top part of FIG. 3 shows the change in the total cholesterol content in the blood as the time elapse when the DS–Na of the invention was injected intravenously, while curve $a_2$ shows in this case the changes in the $\beta$-lipoprotein bond cholesterol in the blood.

As to the curves $b_1$ and $b_2$ and the curves $c_1$ and $c_2$, these are respectively those which show the corresponding results when the DHS–Na and heparin were intravenously injected.

From these results, it can be seen that when the DS–Na of the present invention is injected into the veins the cholesterol content in the blood definitely falls, whereas even though DHS–Na and heparin are similarly injected, if the dose administered is in an amount that does not produce side reactions in the human body as an anticoagulant, say, 1.2 units/kg., there is hardly any decrease in the cholesterol in the blood and thus no effectiveness whatsoever can be observed.

In preparing the DS–Na and DS–K of the invention as an injection for therapeutic purpose, these may be dissolved to a concentration of 1–13% by weight in either sterile distilled water or sterile distilled water containing in suitable concentration a proper substance such as sodium chloride which is compatible with the humor.

However, inasmuch as at the final step this solution is rendered sterile by means of high pressure sterilization while in ampoules or other glass vessels, it is preferable to add carbonates, phosphates or other suitable adjuvants of similar nature to buffer the change in pH so as to prevent the decomposition of the ester or coloration during this sterilization step.

Accordingly, for preparing the DS–Na or DS–K of the invention into a therapeutic drug that can stand preservation it is desirable that the DS–Na be dissolved as to become a concentration of 1–13% by weight in sterile distilled water containing, for example, 0.05–0.35% by weight of sodium bicarbonate and 0.75–0.45% by weight of sodium chloride. Further, according to our researches we found that the DS–Na or DS–K of the present invention whose $[\eta]$ is 0.020–0.050 and sulphur content is 2.0–13.0% by weight was prepared with exceedingly high purity as well as high yield by reacting 0.025–1.250 parts by volume of chlorosulphonic acid with 1 part by weight of dextran whose $[\eta]$ in water at 25° C. is 0.025–0.055 (this condition to apply hereinafter) separating the obtained dextran sulphate, then reacting therewith caustic soda or caustic potash to form the sodium or potassium salt of dextran sulphate and thereafter purifying and separating this sodium or potassium salt.

As to the intrinsic viscosity of the dextran in the invention, it was measured in accordance with the method of determining the intrinsic viscosity of DS–Na or DS–K, as described hereinbefore.

The reason for using as the starting material in the present invention dextran whose $[\eta]$ is 0.025–0.055 is owing to the fact that since in accordance with the invention it is intended to obtain as the final finished product a DS–Na or DS–K having an $[\eta]$ of 0.020–0.050, the decision was made in consideration of the rate of decline of the $[\eta]$ during the entire processing operations of such as the esterification reaction, purification, etc. in accordance with the method of the invention.

This type of dextran having an $[\eta]$ of 0.025–0.055 may be obtained by reacting leuconostoc mesenteroides with cane sugar thereby obtaining the so-called native dextran and thereafter adding an organic solvent such as acetone or methanol. As the acid to be used in this hydrolysis there may be named, for example, the mineral acids such as hydrochloric acid or sulphuric acid, and in the presence of these acids the temperature and time of hydrolysis should be adjusted so that the relative viscosity of the final hydrolytic liquid is at least below 1.30.

As to the solvent to be used in sulphating the dextran obtained in this manner using chlorosulphonic acid, pyridine as used in the known method in the formation of sulphated polysaccharides is not suitable for obtaining in a pure state and moreover with good yield the dextran sulphate of low degree of sulphation, which is the final product.

The reason for this is as follows: When dextran is introduced into a heated mixture of pyridine and chlorosulphonic acid or when for dissolving it dextran is heated in pyridine for a comparatively long period of time followed by treatment with a pyridine-chlorosulphonic acid mixture since in either case it must be heated to above 60° C. and reacted, an excessive drop in the degree of polymerization of the dextran sulphate results. And furthermore because of the necessity of repeated decoloration operations or separation and precipitation operations, etc. on account of its excessive coloration, the yield of the final product is reduced to a pronounced degree, and moreover a part of the dextran sulphate combines by forming salts. In addition, as a result of part of the dextran sulphate having a colloidal property pyridine of strong toxicity becoming adsorbed or mixed in therewith, for removing the same, it becomes necessary to carry out such as dialysis, etc. which extends over long hours. Moreover, when the above operation is carried out, there is the fault that not only the pyridine but also the dextran sulphate moves to the outside of the film as to become a cause of the lowering of the yield.

In contrast, on account of the fact that the sulphation in accordance with the present invention, wherein formamide is used, can be carried out readily at a reaction temperature below 30° C., the extent of the drop in the degree of polymerization and also its coloration, when compared with the pyridine method, being very small, there is no necessity of repeatedly performing decoloration operations or separation and precipitation operations such as would cause a lowering of the yield. In addition, even if the formamide that is used as the solvent should get mixed in the final product, owing to the fact that the toxicity of formamide itself is very low as compared with pyridine, there is no necessity of performing dialytic operations such as would affect adversely the yield as mentioned hereinbefore. Actually, since the formamide readily decomposes into ammonia and formic acid by means of the caustic alkali that is added during the purification of the dextran sulphate after the completion of the reaction, it may be completely removed by purification operation in which are used the cationic and anionic exchange resins of the resulting substances. Therefore, in accordance with the method of the present invention, not only is it possible with respect to the improvement in the yield and quality of the product to lessen the economic disadvantages or therapeutic hazards that are attendant upon the use of pyridine, but also by controlling the decline in the intrinsic viscosity during the esterification and purification steps it is possible to produce DS–Na or DS–K having the desired intrinsic viscosity with high purity as well as high yield.

Incidentally, the yield of dextran sulphate by using pyridine is ¼–⅓ of that of the method in accordance with the present invention in which formamide is used as the solvent.

While the amount of formamide to be used in the present invention is at its optimum when 5–15 parts by volume are used to 1 part by weight of dried dextran, one need not be necessarily restricted within this range.

And while the amount of chlorosulphonic acid used for sulphation differs depending on the value of the intrinsic viscosity, in case for obtaining a dextran sulphate whose sulphur content is 2.0–13.0% by weight, the use of an amount within the range of 0.025–1.250 parts by volume of the chlorosulphonic acid to 1 part by weight of dried dextran is permissible.

In carrying out the reaction under the above conditions, it is preferable, for example, either to dissolve the dextran in formamide and then add dropwisely therein gradually chlorosulphonic acid, or to add with stirring gradually a mixture of chlorosulphonic acid and a part of the formamide to be used in dissolving the dextran to the dextran dissolved in the remainder of the formamide and thereafter continuing the reaction for 1–5 hours with stirring or shaking.

However, for the purpose of completing the reaction, the reaction time may be, for example, extended to about 24 hours.

In adding, as described hereinabove, chlorosulphonic acid or the mixed solution of chlorosulphonic acid and formamide to the aforesaid formamide solution of dextran, it is preferred that the former or latter solution be added gradually, the dropwise addition being particularly desirable. In this instant, it is preferable that the contact of the two solutions be had at a temperature ranging from 10° C. to the freezing temperature of mixed solution to be obtained. When the two solutions are mixed as above, since the freezing point of the mixed solution to be obtained is gradually falls, it is possible therefore to add a cooling agent and lower the temperature of the two solutions as compared with when they first make contact.

The reasons why the contact temperature of the two solutions are maintained in the present invention in the range of 10° C. to the freezing temperature of the mixed solution to be obtained is as follows: Inasmuch as the drop of the degree of polymerization of a dextran sulphate having an $[\eta]$ of 0.020–0.050 is most striking at this stage, the purpose is to control this drop in the degree of polymerization and thus effect adjustments so as to obtain the desired final $[\eta]$ and also to prevent coloration. Another purpose is to control the decomposition of chlorosulphonic acid, the esterifing agent, so as to esterify the dextran to the extent that its sulphur content becomes 2.0–13.0% by weight.

Therefore, the contact temperature in mixing of the aforesaid two solutions during the step of esterification with sulphuric acid is very important in the present invention.

While in the esterification step of the invention the two solutions are mixed while contacting at the temperature as described above, a greater part of the esterification is carried out at this temperature. During the final stages of the reaction before completion of esterification the temperature can however be raised to, say, about 20–35° C.

The dextran sulphate thus formed can be readily separated independently by adding the reaction mixture, for example, to an organic solvent miscible with water such as acetone or methanol. By doing thus, the dextran sulphate is precipitated. While the impurities contained in the precipitant can then be separated out substantially by decanting or centrifuging, in order to completely remove the impurities bonded adsorptively to the dextran sulphate, it is recommended to carry out the operations consisting of dissolving the independently separated dextran sulphate in as little as possible of water, then adding to this solution under cooling and with stirring a caustic alkali, for example, a 40% caustic soda or caustic potash solution followed by heating for awhile and thereafter using a cationic or anionic exchange resin and performing the operations by the batch method or the column method. In this case, the cationic exchange resin used is either a strongly acid type or a weakly acid type while the anionic exchange resin is either a strongly basic type or a weakly basic type.

After completion of ion-exchange the dextran sulphate is made into a sodium or potassium salt, then decolored and filtered. The filtrate is then either freeze-dried or added to an organic solvent which is miscible with water such as an acetone or methanol in excessive amounts and after separation of the sodium or potassium salt of dextran sulphate, it is washed with methanol, ether, etc. followed by drying under reduced pressure and at low temperature and thereafter made into a powder.

The yield of the thus obtained salt of dextran sulphate is, when expressed in terms of dextran, from 70 to 110%.

The toxicity ($LD_{50}$) as shown in FIG. 3 of this sodium or potassium salt of dextran sulphate is from 16.0 g./kg.–5.0 g./kg. and sufficient lipolytic activity is induced in the blood when the dosage administered to the human body is, for example, in case of intravenous administration, from 1.2 to 6.0 mg./kg.

Further, in the purification steps of the invention, by the repetition 3 to 4 times of the separation and precipitating operations following the treatment of adding the alkali, when carrying out the aforementioned operations, it is also possible to prepare a pure sodium or potassium salt of dextran sulphate that do not contain any impurities.

In this case however, while the yield in terms of the dextran becomes 30–40%, the lipolytic activity and the toxicity are not affected at all.

Next, examples will be given illustrating the invention. It is to be understood however that these are merely present for illustrative purposes and are not to be construed as restricting the invention.

*Example 1*

In 1 liter of formamide 100 grams of thoroughly dried dextran powder ($[\eta]=0.038$) were dissolved. Then while cooling this using a bath of Dry Ice and acetone, 9 cc. of chlorosulphonic acid was added dropwisely therein continuously with stirring at below 5° C. and thereafter the solution was gradually heated and then shaken for 2 hours at 25° C.

The reactant solution was then poured into 3.6 liters of acetone. And after decanting and separating a sirupy precipitate formed which was washed in a small quantity of acetone, this precipitate was dissolved in 300 cc. of water. Then while cooling this solution to below 5° C. using a cooling agent, 60 cc. of a 40% caustic soda solution was added dropwisely therein followed by heating and continuation of stirring for 20 minutes at 10–20° C. This was then passed through a column packed with cationic and anionic exchange resins followed by neutralizing with 1 N caustic soda solution. Then after decoloring with active carbon, the solution was poured into a large amount of acetone, and the precipitated sodium salt of dextran sulphate was separated by decanting or centrifuzing. After thoroughly washing this with anhydrous methanol and ether in the order given, it was dried under reduced pressure at a temperature below 20° C. and made into a powder. The yield was 70 grams, and the product obtained was a white, hygroscopic, amorphous powder whose sulphur content was 2.8% by weight. The $[\eta]$ was 0.036 and the $LD_{50}$, 15.5 g./kg.

*Example 2*

Into the solution after decomposition with alkali of Example 1 1.4 liters of acetone was gradually added with stirring. Then the separated out sodium salt of dextran sulphate was collected separately. After again dissolving this in 300 cc. of water, 1.2 liters of acetone was carefully added as above, and the sodium salt of dextran sulphate was precipitated again. After subsequently repeating twice in a same manner the separation and precipitation operations, decoloration and filtration was performed followed by freeze-drying of the filtrate. The yield was 30 grams and the resultant product did not contain inorganic sulphates or other impurities.

*Example 3*

100 grams of dextran of an intrinsic viscosity of 0.036 were dissolved in 0.8 liter of formamide, and 100 cc. of chlorosulphonic acid was reacted therewith as described in Example 1. Then, after heating to 25° C., shaken for 5 hours and treated as described in Example 1, a sodium salt of dextran sulphate was obtained. Its sulphur content was 12.1%, $[\eta]$, 0.032 and $LD_{50}$, 5.7 g./kg. The yield was 110 grams.

Having thus described the nature of the invention, what we claim is:

1. A method of preparing an alkali metal salt of dextran sulphuric acid ester having substantially no anticoagulant activity but having lipolytic activity whose intrinsic viscosity in a 0.7 saline solution at 25° C. is 0.020–0.050 and whose sulphur content is 2.0–13.0% by weight, which comprises reacting in the presence of 5–15 parts by volume of formamide 0.025–1.250 parts by volume of chlorosulphonic acid with 1 part by weight of dextran whose intrinsic viscosity in water at 25° C. is 0.025–0.055 and in the absence of pyridine, then reacting with the obtained dextran sulphuric acid ester a caustic alkali thereby forming an alkali metal salt of dextran sulphuric acid ester and thereafter purifying the same.

2. A method as defined in claim 1 wherein said alkali metal salt is selected from the group consisting of the sodium and the potassium salts of dextran sulphuric acid ester.

3. A method of preparing an alkali metal salt of dextran sulphuric acid ester having substantially no anticoagulant activity but having lipolytic activity whose intrinsic viscosity in a 0.7 mol saline solution at 25° C. is 0.020–0.050 and whose sulphur content is 2.0–13.0% by weight, which consists essentially of reacting in the presence of 5–15 parts by volume of formamide 0.025–1.250 parts by volume of chlorosulphonic acid with 1 part by weight of dextran whose intrinsic viscosity in water at 25° C. is 0.025–0.055 and in the absence of pyridine, then adding to the obtained reactant product an organic solvent miscible with water thereby precipitating and separating the dextran sulphuric acid ester, thereafter reacting a caustic alkali with the separated dextran sulphuric acid ester to form an alkali metal salt of dextran sulphuric acid ester followed by purifying the same.

4. A method as defined in claim 3 wherein said alkali metal salt is selected from the group consisting of the sodium and the potassium salts of dextran sulphuric acid ester.

5. A method as defined in claim 1 wherein said chlorosulphonic acid is contacted with a formamide solution of said dextran, whose intrinsic viscosity in water at 25° C. is 0.025–0.055, at a temperature ranging from 10° C. to the freezing temperature of the mixed solution obtained.

6. A method as defined in claim 3 wherein said chlorosulphonic acid is contacted with a formamide solution of said dextran, whose intrinsic viscosity in water at 25° C. is 0.025–0.055, at a temperature ranging from 10° C. to the freezing temperature of the mixed solution obtained.

7. A method as defined in claim 1 wherein a formamide solution of said chlorosulphonic acid is contacted with a formamide solution of said dextran, whose intrinsic viscosity in water at 25° C. is 0.025–0.055, at a temperature ranging from 10° C. to the freezing temperature of the mixed solution obtained.

8. A method as defined in claim 3 wherein a formamide solution of said chlorosulphonic acid is contacted with a formamide solution of said dextran, whose intrinsic viscosity in water at 25° C. is 0.025–0.055, at a temperature ranging from 10° C. to the freezing temperature of the mixed solution obtained.

9. A method as defined in claim 1 wherein the purification is effected using cationic and anionic exchange resins.

10. A method as defined in claim 3 wherein the purification is effected using cationic and anionic exchange resins.

11. A method as defined in claim 1 wherein said purification comprises passing an aqueous solution containing an alkali metal salt of dextran sulphuric acid ester through a layer of cationic and anionic exchange resins, adding to the obtained dextran sulphuric acid ester an aqueous solution of an alkali metal salt so as to again form an aqueous solution of an alkali metal salt of dextran sulphuric acid ester, then effecting decoloration and filtration of this aqueous solution and thereafter separating an alkali metal salt of dextran sulphuric acid ester from said aqueous solution.

12. A method as defined in claim 3 wherein said purification comprises passing an aqueous solution containing an alkali metal salt of dextran sulphuric acid ester through a layer of cationic and anionic exchange resins, adding to the obtained dextran sulphuric acid ester an aqueous solution of an alkali metal salt so as to again form an aqueous solution of an alkali metal salt of dextran sulphuric acid ester then effecting decoloration and filtration of this aqueous solution and thereafter separating an alkali metal salt of dextran sulphuric acid ester from said aqueous solution.

References Cited in the file of this patent

UNITED STATES PATENTS

| | | |
|---|---|---|
| 2,587,623 | Jeanes et al. | Mar. 4, 1952 |
| 2,644,815 | Grönwall et al. | July 7, 1953 |
| 2,715,091 | Ricketts et al. | Aug. 9, 1955 |

FOREIGN PATENTS

| | | |
|---|---|---|
| 715.821 | Great Britain | Sept. 22, 1954 |